Patented Sept. 16, 1947

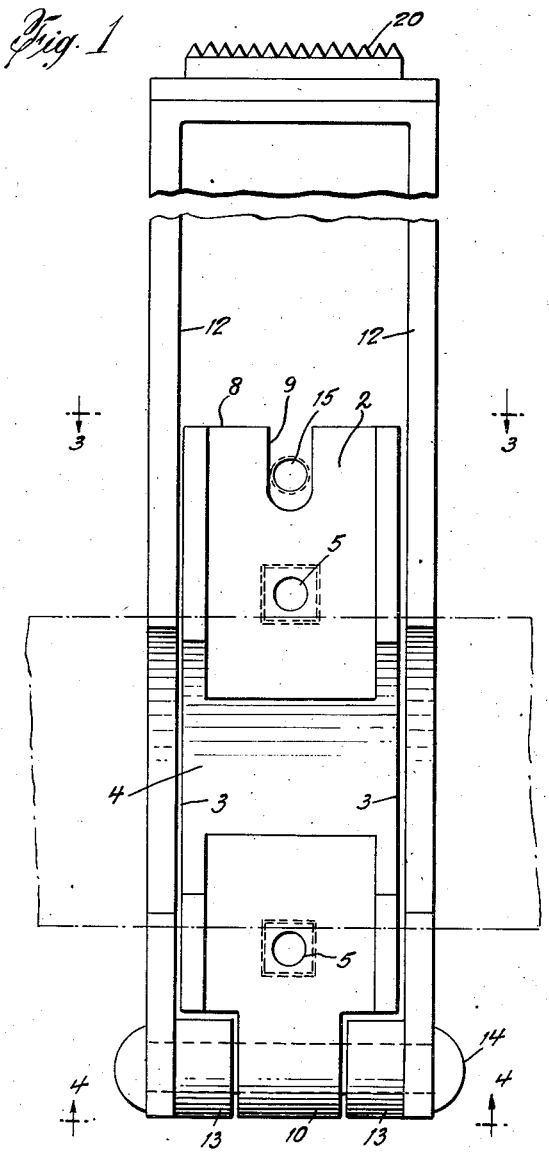
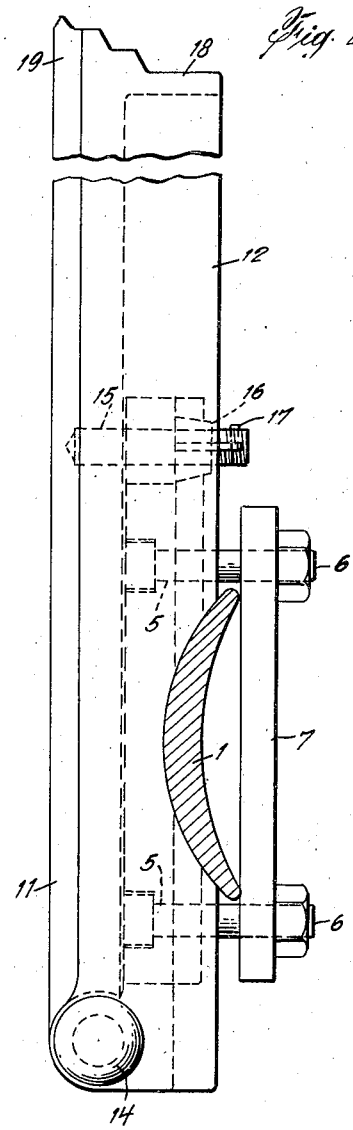
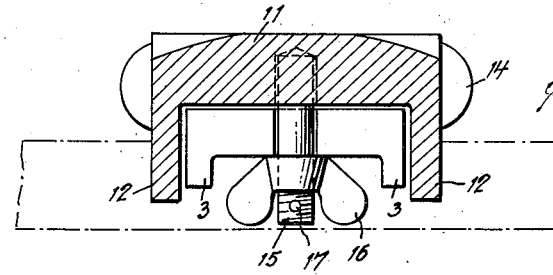

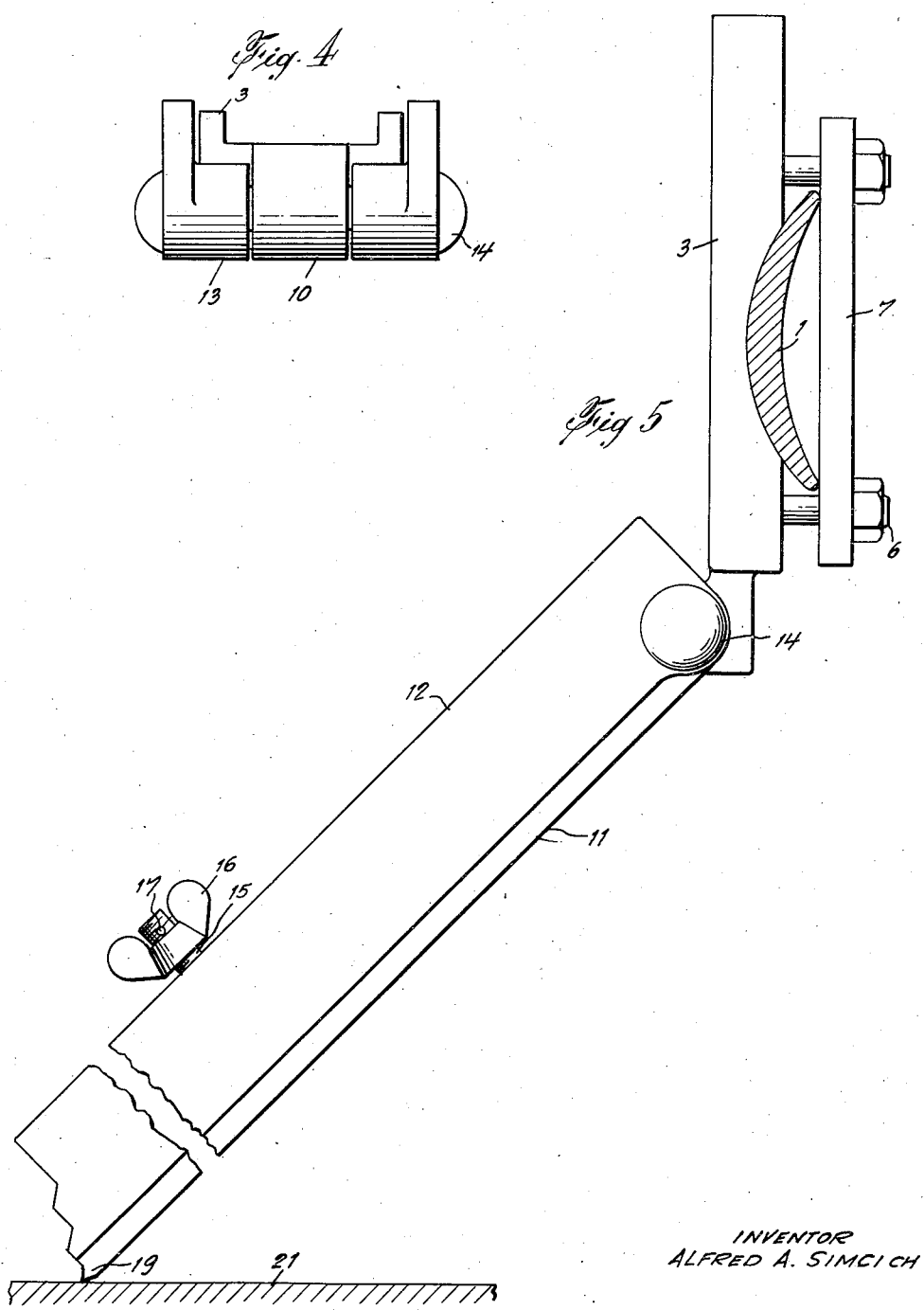

2,427,424

UNITED STATES PATENT OFFICE 2,427,424

SPRAG BRAKE FOR AUTOMOBILES

Alfred A. Simcich, Long Island City, N. Y.

Application January 4, 1946, Serial No. 639,090

8 Claims. (Cl. 188—6)

The present invention is directed to accessories for automobiles, more particularly to a device adapted to be attached to the bumper of the automobile and intended to act as a safety device or guard.

It has become quite common at the present time where it is desired to jack up a car in order to change tires, or for some other purpose, to place the jack under the bumper, either front or rear, and raise the bumper whereby the entire car is raised and the wheel is lifted from the ground. Because of the relatively great height to which a car is raised by such an arrangement, there is grave danger that the car will slip from the jack. This is accentuated by the weight of the car, which is relatively great, and a slight movement thereof may start the car rolling even though the brakes may be set.

There have been some devices previously known which in part have been intended to prevent accidental movement of a vehicle, but none of them have been adapted for or are capable of preventing a car from slipping off of a jack. For instance, it has been proposed to provide on the rear axle of a car a device which is pivoted thereto and is adapted under certain conditions to be lowered so that it touches the ground and thus act as an auxiliary brake to prevent skidding. Such a device was not capable of holding a car so as to prevent the slipping thereof off of a jack while the car is stationary.

Another device consisted of a pivoted tongue or dog adapted to be attached to the under side of a vehicle and having at its lower or free end teeth for gripping the ground. Such a device was intended to be attached to the rear of a wagon or the like so that in going up a steep grade, the device would drag along the ground and when traction was removed, the slipping of the wagon backward would cause the teeth to engage the ground and act as a brake. This device also was not capable of accomplishing the results obtained by applicant's device and it had many limitations.

The present invention is intended and adapted to overcome the defects in devices previously used on vehicles, it being among the objects thereof to provide a guard device adapted to be attached to the bumper of an automobile which will prevent the slipping of a car from a jack, particularly a bumper jack.

It is also among the objects of the present invention to provide a device attachable to a bumper which will act as a guard for the car in the normal operation thereof.

It is still further among the objects of the present invention to provide a device of the character described which is secured to the bumper and includes a hinged member which at the desired time may be released so as to contact with the ground.

In practicing the present invention, there is provided a base member which is suitably attached to a bumper, either front or rear, but preferably both. If desired, more than one such device may be attached to each bumper. At the lower end of the base is a hinge or pivot in a horizontal position carrying a guard bar of relatively great length. Normally when the guard is in inoperative position, means are provided for holding the same against the base, whereby it extends upwardly a substantial distance above the bumper and acts as a guard for the body of the car.

When the car is placed on a jack, the guard bar is released and swings around its hinge so that the free end thereof touches the ground. This may be done at both front and rear of the car even though only one end of the car is placed on a jack. The length of the guard bar is sufficient so that at the extreme height to which a car may be raised, the free end of the bar contacts with the ground. Means are usually provided for insuring that the free end of the bar will dig into and be firmly anchored in the ground or pavement.

In the accompanying drawing constituting a part hereof and in which like reference characters indicate like parts, Fig. 1 is a rear elevational view of a safety device made in accordance with the present invention, showing the guard bar in closed or inoperative position, some parts being broken away for clearness;

Fig. 2 is a side elevational view of the device in the position shown in Fig. 1, some parts being shown in cross-section;

Fig. 3 is a horizontal cross-sectional view thereof taken along the line 3—3 of Fig. 1;

Fig. 4 is an elevational view of the device in the position shown in Fig. 1 looking up from below; and Fig. 5 is a view similar to Fig. 2, showing the device in the open or operative position.

The usual bumper 1 is provided on the front and rear of the car. A base 2 having a pair of lateral projections or wings 3 has its rear surface curved as shown at 4 similar to the curve on bumper 1. A pair of top and bottom openings 5 in base 2 above and below bumper 1 have bolts 6 passing through the same and through similar openings in plate 7 to hold the base firmly in contact with bumper 1. The top edge 8 of base 2 has a slot 9 centrally thereof. The bottom 10 is formed with a horizontal opening to accommodate a hinge pin.

A guard bar 11 elongated in form has sides 12 adapted to embrace the sides of base 2. It is provided at the lower end with hinge members 13 complementary to member 10 and a hinge pin or bolt 14 passes through the openings to form a horizontal hinge. A screw 15 is threaded into bar 11 and in the position shown in Figs. 1 to 3 passes through slot 9 and a wing nut 16 is threaded on the free end thereof to hold the bar against the base. An opening 17 in screw or bolt 15 provides means for inserting a cotter pin or the like to prevent accidental unthreading of nut 16.

The free end 18 of bar 11 is usually made with a series of steps as shown in Fig. 2. The extreme end 19 thereof is formed with a series of notches 20 to give a roughened edge. Such edge is adapted to be anchored into the ground or a paved surface.

In the operation of the device when in the position shown in Figs. 1 to 3, the bar 11 is in a vertical position and extends a substantial distance above the top of bumper 1. Thereby it acts as a guard for both front and rear of the car body and prevents damage thereto by accidents.

If it is desired to jack up the car for the purpose of an under-body repair or for the change of a tire or wheel, the jack is placed under the bumper and held in position. Then nut 16 is loosened and bar 11 allowed to pivot around hinge 14, as shown in Fig. 5, until edge 19 touches ground 21. If the front end of the car is being jacked up, then the device at the rear of the car is so manipulated and vice versa. In order to make completely certain that the car will not roll or move during the repair operation, the device both in front and in the rear may be placed in the position shown in Fig. 5. As the car is raised up by the jack, bar 11 tends to slip along the ground from the angular position shown in Fig. 5 and tends to assume a vertical position. The length of bar 11 is sufficient so that when the car is in its uppermost position, the bar is not quite in a vertical position. This applies to the highest end of the car. At the opposite end thereof, the bar 11 will be at a fairly sharp angle to the horizontal and therefore will act with great efficiency to prevent any rolling of the car.

Although the invention has been described by a single specific embodiment thereof, it will be apparent to those skilled in the art that many changes in the details of construction may be made within the spirit of the invention. For instance, the safety device may be placed at the mid point of the bumper or may be placed adjacent to one or both sides thereof. The means for attaching the same to the bumper may be other than that shown. In place of the wing nut and bolt arrangement for locking or latching the guard bar to the base other means for maintaining such a position may be used. Also, the form, shape and size of the several parts of the device may be varied to suit conditions, such as the shape of element 4, which may be changed to suit the bumper to which it is attached. The materials used in the construction thereof may be any of those normally adapted for such a purpose. These and other changes in the details of the invention may be made without departing from the spirit thereof and the invention is therefore to be broadly construed and not to be limited except by the character of the claims appended hereto.

I claim:

1. An automobile safety device comprising a base, means for securing the same to an automobile bumper, a horizontal hinge on said base, said hinge being located below said bumper, a substantially rigid guard bar hinged to said base, the length of said bar being such that the free end is capable of touching the ground, and means for holding said bar against said base.

2. An automobile safety device comprising a base, means for securing the same to an automobile bumper, a horizontal hinge on said base at a point below the level of said bumper, a guard bar hinged to said base, the length of said bar being such that the free end is capable of touching the ground, and means for holding said bar against said base.

3. An automobile safety device comprising a base, means for securing the same to an automobile bumper, a horizontal hinge on said base, a guard bar hinged to said base, the length of said bar being such that the free end is capable of touching the ground, and means for holding said bar against said base, said free end having a serrated edge to anchor said bar into said ground.

4. An automobile safety device comprising a base, means for securing the same to an automobile bumper, a horizontal hinge on said base, a guard bar hinged to said base, the length of said bar being such that the free end is capable of touching the ground, and means for holding said bar against said base, including a screw and nut arrangement on said bar and base.

5. An automobile safety device comprising a base, means for securing the same to an automobile bumper, a horizontal hinge on said base, a guard bar hinged to said base, the length of said bar being such that the free end is capable of touching the ground, and means for holding said bar against said base, the upper end of said base being slotted, a bolt in said bar passing through said slot when said bar is in position against said base, and a nut on said bolt for retaining said position.

6. An automobile safety device comprising a base, means for securing the same to an automobile bumper, a horizontal hinge on said base, a guard bar hinged to said base, the length of said bar being such that the free end is capable of touching the ground, said bar being channel shape in cross section, said channel adapted to embrace said base, and means for holding said bar against said base.

7. An automobile safety device comprising a base, means for securing the same to an automobile bumper, a horizontal hinge on said base, said hinge being located below said bumper, a substantially rigid guard bar hinged to said base, the length of said bar being such that the free end is capable of touching the ground, said base and bar being elongated and the longitudinal axes thereof being in a vertical plane, and means for holding said bar against said base.

8. An automobile safety device comprising a base, means for securing the same to an automobile bumper, a horizontal hinge on said base, said hinge being located below said bumper, a substantially rigid guard bar hinged to said base, the length of said bar being such that the free end is capable of touching the ground, and means for holding said bar against said base, said free end extending a substantial distance above the top of said base.

ALFRED A. SIMCICH.

REFERENCES CITED

The following references are of record in the file of this patent:

UNITED STATES PATENTS

| Number | Name | Date |
| --- | --- | --- |
| 1,719,313 | Scott | July 2, 1929 |
| 1,826,937 | Jensen | Oct. 13, 1931 |
| 1,565,130 | Watkins | Oct. 8, 1925 |
| 2,270,004 | Hines | Jan. 13, 1942 |
| 2,343,459 | Hines | Mar. 7, 1944 |
| 2,179,070 | Weise | Nov. 7, 1939 |